United States Patent [19]

Fitzgerald

[11] 3,813,775

[45] June 4, 1974

[54] MEAT CLEANER AND CONDITIONER

[76] Inventor: Robert E. Fitzgerald, 8203 Gumtree Dr., Baltimore, Md. 21222

[22] Filed: May 17, 1972

[21] Appl. No.: 254,316

[52] U.S. Cl. ................ 30/279 R, 241/95, 241/168, 15/93 R, 30/123.5
[51] Int. Cl. ........................................... A22c 17/00
[58] Field of Search .......... 30/1, 279 A, 279 B, 351, 30/280, 123.5, 123; 15/93 R; 76/12, 13; 241/83, 95, 168

[56] References Cited
UNITED STATES PATENTS

| | | | |
|---|---|---|---|
| 575,947 | 1/1897 | Hart | 241/95 X |
| 1,184,211 | 5/1916 | Rellinger | 30/279 R |
| 3,323,863 | 7/1943 | Feemster | 30/279 R |
| 2,563,362 | 8/1951 | Porter | 15/93 R |
| 2,615,486 | 10/1952 | Marcus | 241/168 |
| 2,777,195 | 1/1957 | Dalianis | 30/279 R |

Primary Examiner—Al Lawrence Smith
Assistant Examiner—J. C. Peters
Attorney, Agent, or Firm—Walter G. Finch

[57] ABSTRACT

A meat cleaning and conditioning device is provided for removing meat and bone dust from large or small quantities of freshly cut meat. In one embodiment of the invention, the device consists of a base having an upper convex surface with an opening therein. A cleaning and conditioning plate, also of convex shape, is positioned in the opening. This plate has spaced apertures therein, with the apertures having sharp cutting edges for removing bone and meat dust from the surface of the meat being cleaned thereof.

In a second embodiment of the invention, a small hand operated meat cleaning and conditioning device is provided which consists of a plate having a handle. The plate has spaced apertures provided therethrough and the apertures are provided with sharp cutting edges. This device can be hand operated or adapted for use in conjunction with the permanent base mentioned above.

3 Claims, 10 Drawing Figures

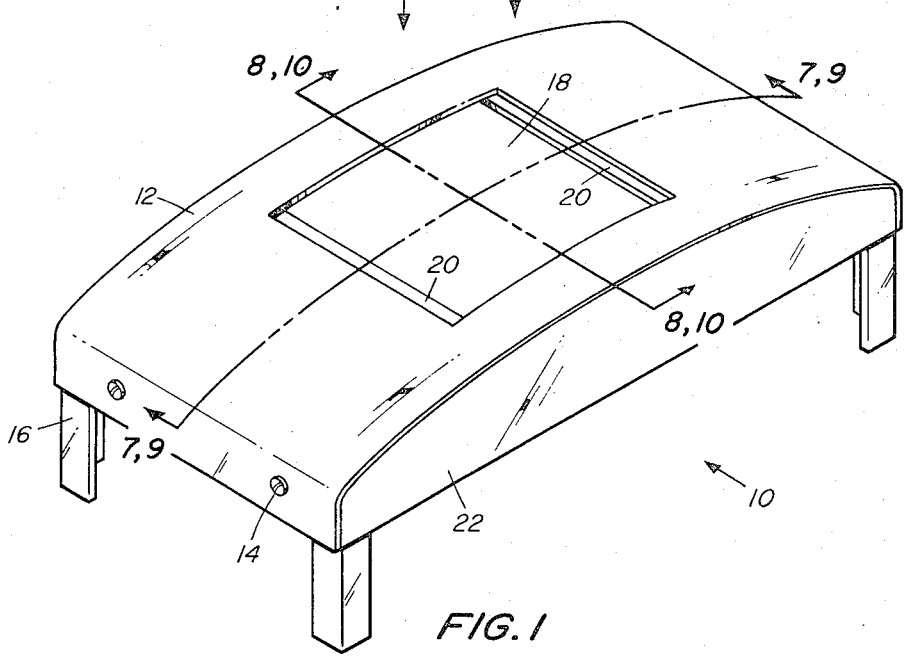

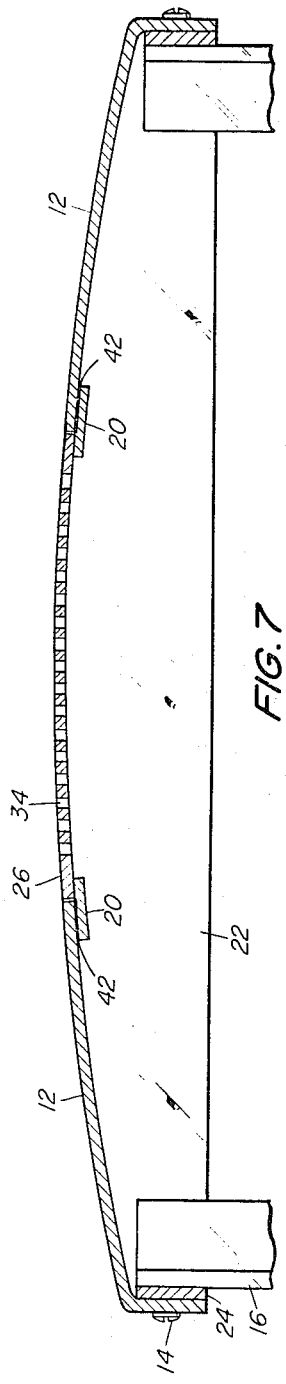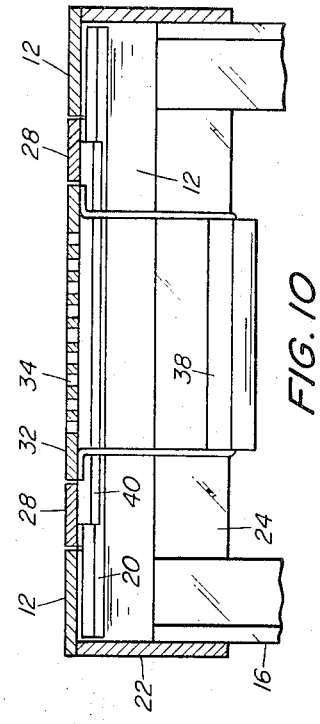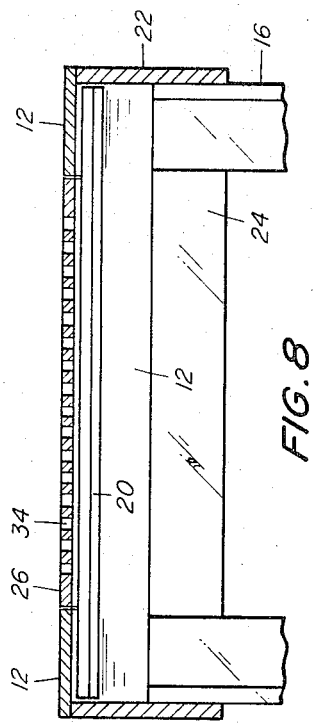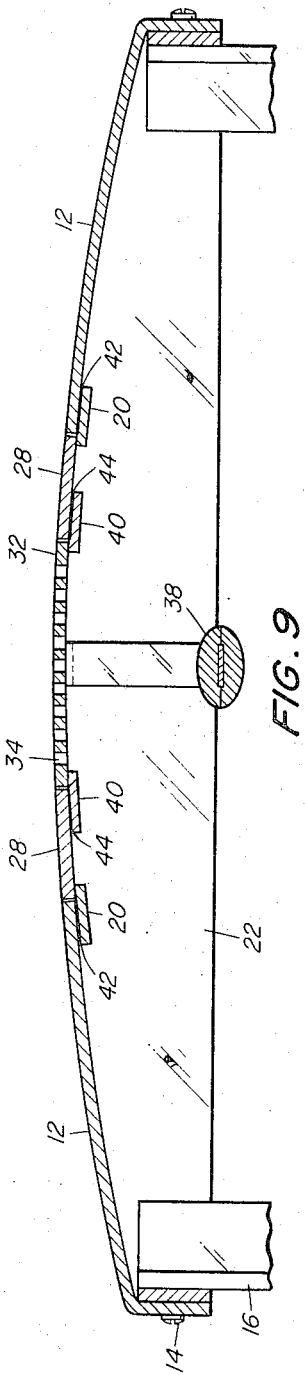

MEAT CLEANER AND CONDITIONER

This invention relates generally to meat cleaning and conditioning devices, and more particularly it pertains to a meat cleaner and conditioner for cleaning all meat and bone dust from the surface of meat freshly cut with a meat saw.

Normally when meat is cut with a meat saw, bone marrow, bone and meat dust will be left on the meat. Such bone marrow, bone and meat dust spoils very rapidly and should be removed promptly and completely in order to have good and proper tasting meat for later use.

Most meat cleaners in use today to clean the meat, must be drawn over the meat with the grain or they will rough up the surface of the meat causing consequently loss of meat juices. This results in dried out, discolored meat.

Because of time consumed with this type of cleaner and the unsatisfactory results obtained, most butchers or meat men use a cloth or rag to clean bone and meat dust and marrow off of the meat.

This is an unwholesome practice because it does not clean the meat but presses bone and meat particles into the surface of the meat. This results in a sour scum on the surface of the meat which causes bad tasting, harmful bacteria to set up, with the result of unclean, unwholesome meat.

An object of this invention, therefore, is to provide a meat cleaner and conditioner which can be drawn over the surface of meat either with or against the grain, clean the meat and leave it in such a condition that it will be clean, sanitary and be smooth as meat that is cut with a knife.

Another object of this invention is to provide a meat cleaner and conditioner that will clean and condition meat and leave the meat with its natural color, and in which the meat will have a longer in-store life because it is completely clean and scum free.

Still another object of this invention is to provide a meat cleaner and conditioner in which there is economy of use and in which clean and wholesome meat is provided after being cut by a meat saw.

These and other objects and attendant advantages of this invention will become more obvious and understood from the following detailed description and accompanying drawings in which:

FIG. 1 is a perspective view of a base stand for supporting a meat conditioner and cleaner incorporating features of this invention;

FIG. 2 is a perspective view of a first embodiment of the meat conditioner and cleaner of this invention;

FIG. 3 is a perspective view of a second embodiment of a hand-held meat conditioner and cleaner of this invention;

FIG. 4 is a phantom view of the hand-held meat conditioner and cleaner of FIG. 3 shown in an inverted position for insertion into an adapter plate of FIG. 5;

FIG. 5 is a perspective view of an adapter plate for the hand held meat conditioner and cleaner of FIG. 3;

FIG. 6 is a partial cross section of the cleaning plates taken along line 6—6 of FIGS. 2 and 3 of the meat conditioners thereof;

FIG. 7 is a cross section tanken along line 7—7 of FIG. 1 with the meat conditioner and cleaner of FIG. 2 in position therein;

FIG. 8 is a cross section taken along line 8—8 of FIG. 1 with the meat conditioner and cleaner of FIG. 2 in position therein;

FIG. 9 is a cross section taken along line 9—9 of FIG. 1 with the meat cleaner and conditioner and adapter plates of FIGS. 3 and 5 in position therein; and FIG. 10 is a cross section taken along line 10—10 of FIG. 1 with the meat cleaner and conditioner and adapter plates of FIGS. 3 and 5 in position therein.

Referring now to FIGS. 1, 2, 6, 7, and 8 of the drawings, there is shown a base 10 having a generally convex top 12, with four corner legs 16. A frame 24 is positioned and secured between each pair of end legs 16, and the ends of the top 12 are bent downwardly as best shown in FIGS. 1, 7, and 8, and are secured to the end frames 24 by screws 14. Side plates 22 are positioned on the opposite sides of the base 10 and are contoured at the upper edges to mesh with the top 12.

A cutout opening 18 is provided in the top 12 of the base 10. At one pair of opposite sides of the opening 18, there are provided support or ledges 20 welded at 42, for supporting the cleaner and meat conditioner plates 26 and 32 of this invention in the opening 18 in base 10.

Referring now to FIGS. 2, 6, 7, and 8, for cleaning and conditioning large quantities of meat, there is shown a stainless steel cleaning plate 26 in position in the opening 18 of base 10 supported by the supports 20. This cleaning plate 26 has a convex upper surface corresponding to that of the convex top 12 of the support base 10. Spaced apertures 34 drilled into the stainless steel plate 26 so as to have sharp edges 36, as best shown in FIG. 6. The apertures 34 are usually uniformly spaced in the longitudinal and transverse directions of the plate 26.

In operational use, when a butcher cuts a piece of meat, such as a slice of steak, with a meat saw, normally there is bone and meat dust left on the surface of the piece of meat. In order to promptly remove such bone and meat dust, the piece of meat is pulled across the plate 26 several times so that the apertures 34, with their sharp edges 36, will remove such bone and meat dust. This leaves the meat surface in such a condition that it will be clean, sanitary, and smooth as meat that is cut with a knife, having its natural color.

In order to clean small pieces of meat, the small hand-held cleaning tool 30 of FIG. 3 is utilized. This tool tool 30 has a handle 38 secured to a cleaning plate 32. Plate 32, is similar to plate 26 of FIG. 2 in that it is of stainless steel and is formed with uniformly spaced apertures 36 which are drilled into the plate to have sharp cutting edges 36 as shown in FIG. 6.

In the event that pork chops or lamb chops cut by a meat saw are to be cleaned off bone and meat dust, for example, they are placed on a flat surface and the plate 32 is passed across the surface of the meat being cleaned so that the sharp cutting edges 36 of the apertures 34 remove the meat and bone dust.

As shown in FIGS. 4, 5, 9 and 10, the tool 30 can be inserted into an opening 29 in an adapter plate 28, the latter being the same dimensions as opening 18 in the top 12 of base 10.

The adapter plate 28 is provided with two supports 40, welded as 42, for supporting the hand tool 30 in the opening 29 of the plate 28. The tool 30 and adapter plate 30 are then placed in opening 18, and the tool 30 is supported as shown in FIGS. 9 and 10.

In operational use, the meat being cleaned of bone and meat dust is then passed back and forth over the surface of the plate 32 so that the sharp-edged apertures 36 can remove the bone and meat dust.

Obviously many modifications and variations of the present invention are possible in light of the above teachings. It is, therefore, to be understood that within the scope of the appended claims the invention may be practiced otherwise than as specifically described.

What is claimed is:

1. A meat cleaning and conditioning device, comprising, a plate, a generally U-shaped handle having free-end leg portions thereof secured to spaced portions of one surface of said plate, with said plate having spaced apertures provided therethrough, said apertures being provided with sharp cutting edges on at least an outer cleaning and conditioning surface opposite the surface to which said handle is attached.

2. A meat cleaning and conditioning device as recited in claim 1, and additionally, a base having an upper surface with an opening therein, support means positioned along the edge of and recessed within said opening for supporting said plate with said handle extending downwardly from said opening and said outer cleaning and conditioning surface being flush and continuous with said upper surface.

3. A meat cleaning and conditioning device as recited in claim 2, and additionally, adapter means positionable and supportable within said opening of said base and having an upper surface flush and continuous therewith, an opening formed in said upper surface of said adapter means and formed with recessed support means for supporting said plate therein with said outer surface of said plate being flush and continuous with said upper surfaces of said base and adapter means.

* * * * *